Oct. 31, 1933.   C. W. GREEN   1,932,621
CASH REGISTER
Filed July 31, 1928   6 Sheets-Sheet 1

Inventor
Charles W. Green,
By A. A. Dicke
E. C. Sanborn
Attorneys

Oct. 31, 1933.    C. W. GREEN    1,932,621
CASH REGISTER
Filed July 31, 1928    6 Sheets-Sheet 2

Inventor: Charles W. Green,
A. A. Flicke
E. C. Sanborn
Attorneys

Oct. 31, 1933.  C. W. GREEN  1,932,621
CASH REGISTER
Filed July 31, 1928  6 Sheets-Sheet 3
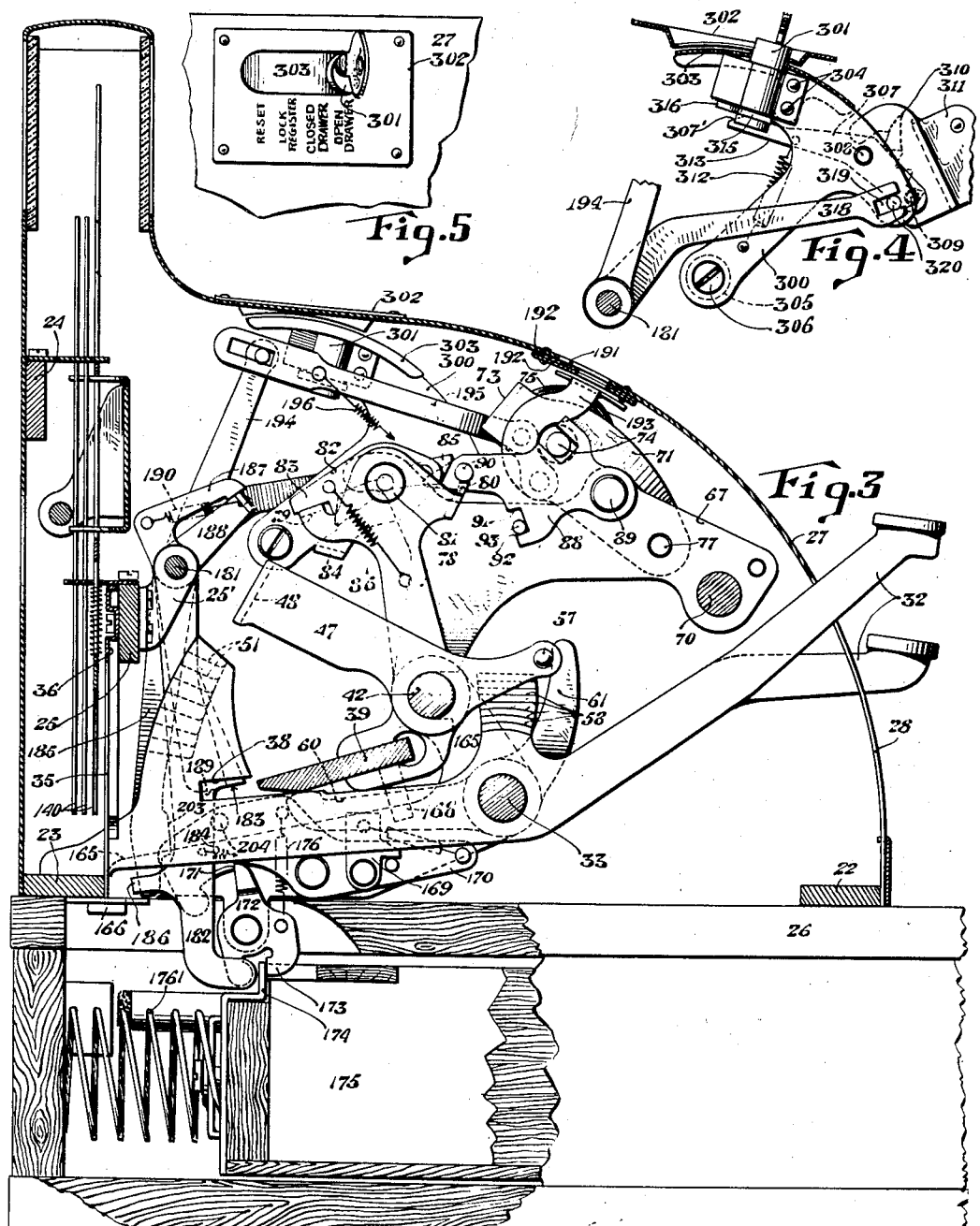
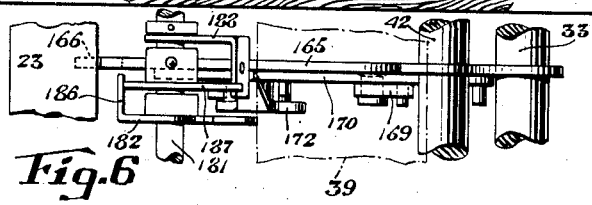
Inventor
Charles W. Green,
Attorneys Oct. 31, 1933.     C. W. GREEN     1,932,621
CASH REGISTER
Filed July 31, 1928     6 Sheets-Sheet 4
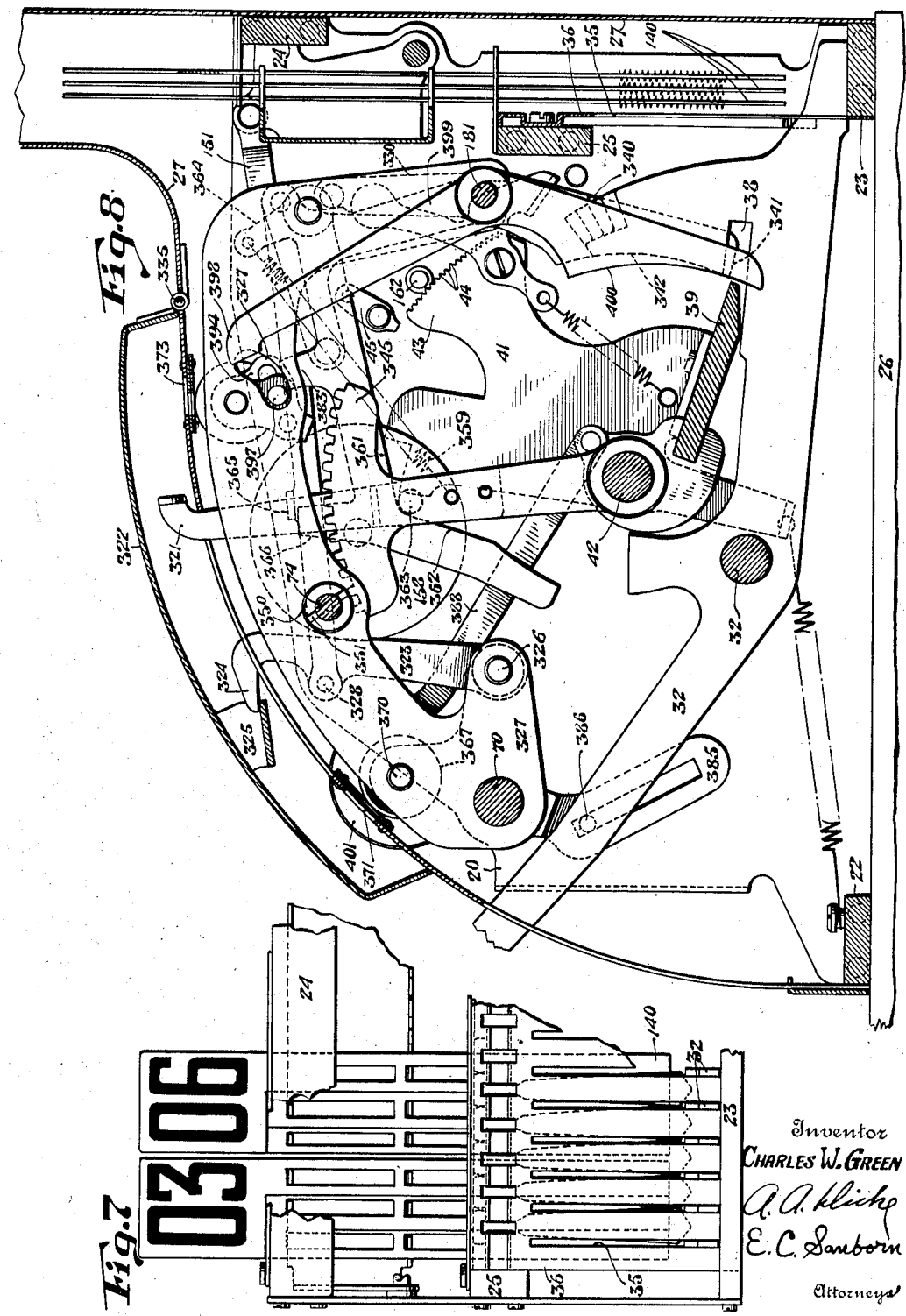
Inventor
CHARLES W. GREEN
Attorneys Oct. 31, 1933.    C. W. GREEN    1,932,621
CASH REGISTER
Filed July 31, 1928    6 Sheets-Sheet 5
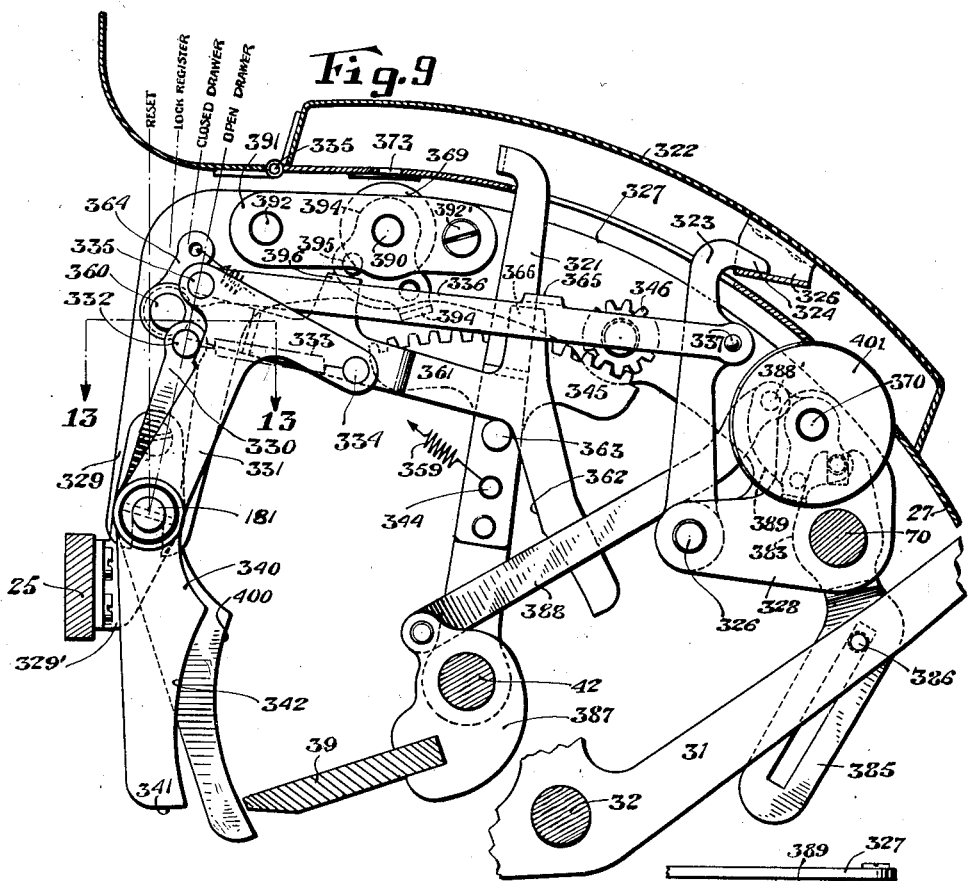
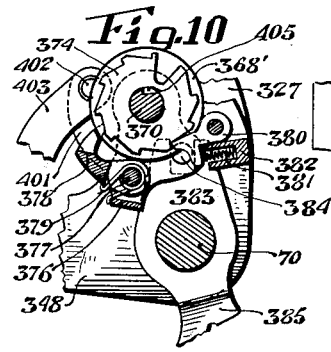
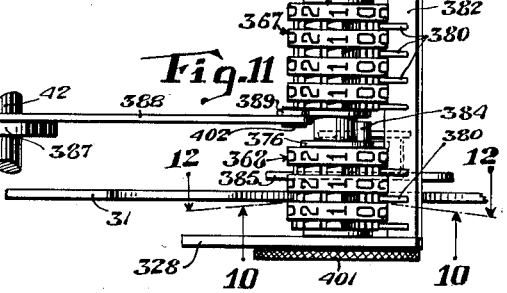
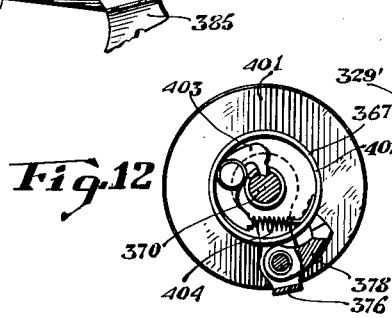
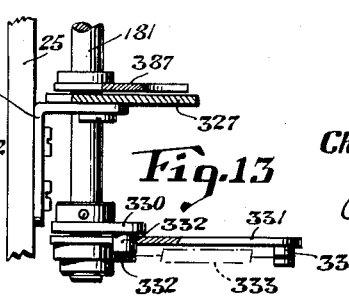
Inventor
Charles W. Green
Attorneys

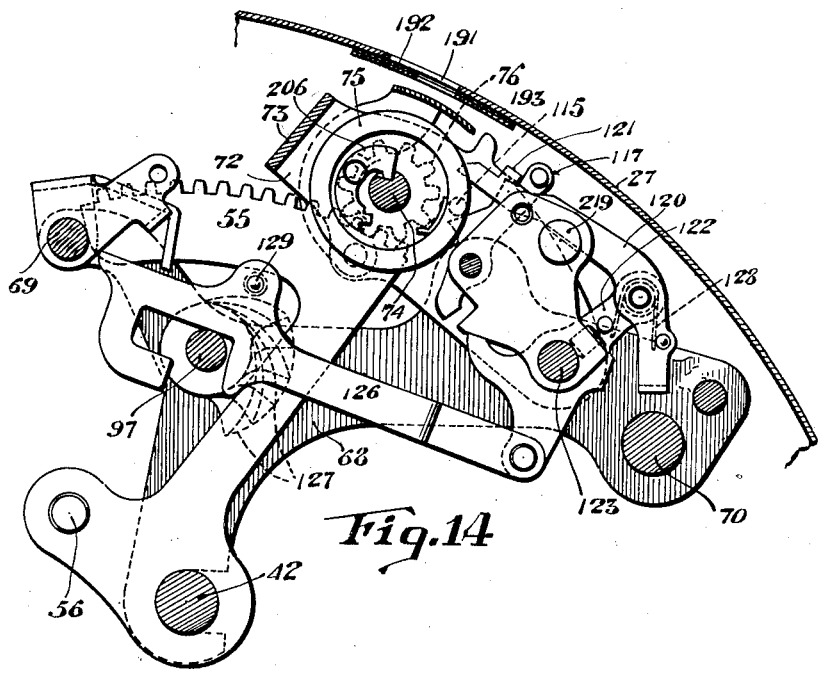
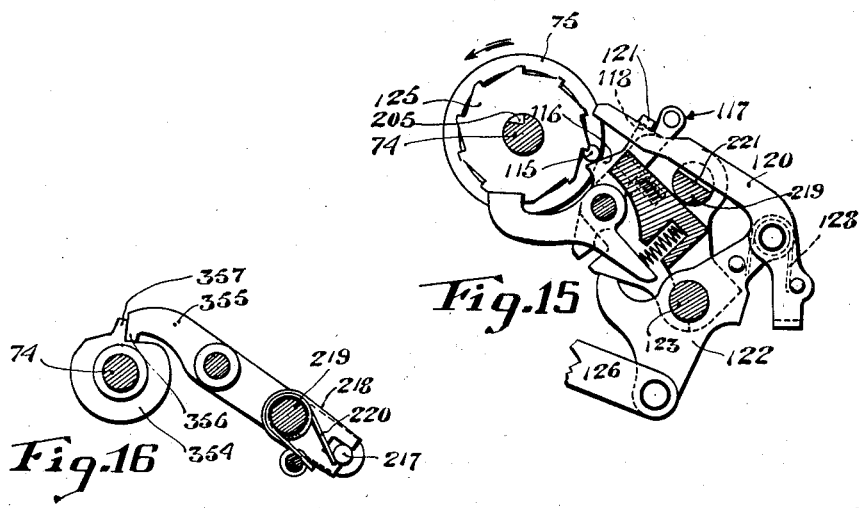

Patented Oct. 31, 1933

1,932,621

UNITED STATES PATENT OFFICE 1,932,621

CASH REGISTER

Charles W. Green, Ilion, N. Y., assignor, by mesne assignments, to The National Cash Register Company, Dayton, Ohio, a corporation of Maryland Application July 31, 1928. Serial No. 296,561

23 Claims. (Cl. 235—130)

One object of my invention is to provide novel and effective means for controlling resetting of a totalizer.

Another object is the provision of a novel mechanism under control of lock and key for controlling various functions of a cash register or accounting machine, including the resetting function aforesaid.

A further object is to provide a simple and improved organization of special counters among which is a novel form of reset counter. These counters are grouped together with a reset lever under a cover and common parts are used for operation and support wherever possible. By this construction parts are eliminated and the machine is simplified for manufacture and assembly.

In respect to the reset counter and the operating mechanism therefor, it is also an object to provide an improved form of construction whereby only the true resetting operations will register on the counter. This novel mechanism does not allow counting of idle operations of the totalizer reset lever, but requires an intervening operation of the machine before movement of the lever will be again counted. Thus it insures a correct indication of the number of resetting operations.

An additional object of the invention is the provision of an improved form of interlocking mechanism between the reset lever and the main operating mechanism, as well as between the reset lever and certain control mechanism.

It is still another object of my invention to provide mechanism consisting of comparatively few parts; which parts, moreover, may be largely punched from sheet metal, whereby very little machine work is required and a low cost of manufacture permitted.

With these and incidental objects in view, the invention consists of certain novel features of construction and combination of parts, the essential elements of which are set forth in the appended claims and a preferred form of embodiment of which is hereinafter described with reference to the drawings which accompany and form part of the specification.

My invention has been illustrated in conjunction with a machine of the type shown in my application Serial No. 183,392, filed April 13, 1927. It will, however, be understood that the invention is not limited to a machine of any particular type, and that instead it may be applied to a variety of types of cash registers and accounting machines.

Of the drawings forming part hereof:

Figure 2:
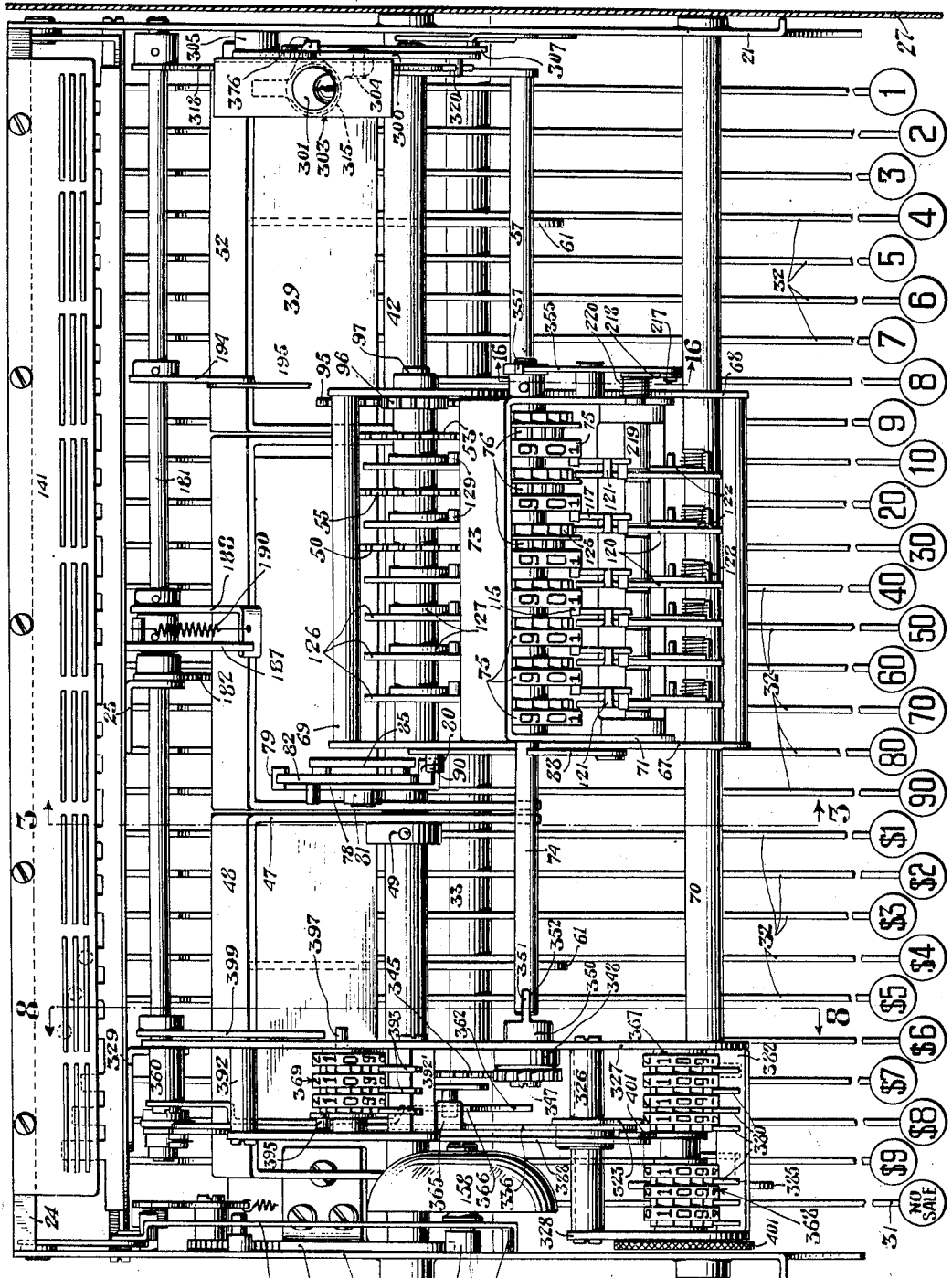

Fig. 2 is a top plan view of the machine, the cabinet being cut away to show the arrangement of the mechanism within. This view shows substantially all the devices used for registering and indicating operations as controlled by the various operating keys. It also shows the single lock control mechanism, the counters and the resetting devices and their location and cooperation with the general operating mechanism of the machine.

Fig. 3 is a sectional elevation of the machine taken along the line 3—3 in Fig. 2 and looking in the direction indicated by the arrows. This view shows the differential and totalizing devices, also the cash drawer releasing controls and the relationship of the operating keys to the various devices.

Fig. 4 is a side elevation of the single lock control lever. This view also shows the locking plate associated with the lever.

Fig. 5 is a plan view of the legend plate for the lock controlled lever showing the various controlling positions which may be taken by the lever.

Fig. 6 is a plan view of a portion of mechanism devoted to the control of the cash drawer and operating mechanism by the lock controlled lever.

Fig. 7 is a partial elevation view of the back of the machine.

Fig. 8 is a sectional view thru the left of the machine. It is taken along the line 8—8 in Fig. 2 looking in the direction indicated by the arrows. This view shows particularly the reset counter and its operating parts, and part of the resetting devices.

Fig. 9 is a sectional elevation view taken just inside the left side frame. This view shows the customer and no sale counter operating devices, also the interlocks between the reset lever and the main operating mechanism, and between said reset lever and its control mechanism.

Fig. 10 is a section thru the no sale counter taken along the line 10—10 in Fig. 11 and looking in the direction shown by the arrows. This view shows the retaining pawls and the deep notch carry actuating devices.

Fig. 11 is a plan view of the no sale and customer counters with their operating parts.

Fig. 12 is a section thru the no sale counter taken along the line 12—12 in Fig. 11 and looking in the direction indicated by the arrows. The resetting mechanism for the counters is illustrated by this view.

Fig. 13 is a sectional plan view taken along the line 13—13 in Fig. 9 and looking in the direction indicated by the arrows. This detail shows the assembly of the reset controlling and interlocking members on the shaft operated by the lock controlled lever.

Fig. 14 is a cross-sectional view of the totalizer and transfer mechanism, showing the position of the parts after the totalizer wheels have been brought to zero.

Fig. 15 is a detail sectional view showing the transfer mechanism.

Fig. 16 is a detail of certain parts which serve to restore the transfer pawls during resetting, said view being taken on line 16—16 of Fig. 2 looking in the direction of the arrows.

The illustrative machine

Figures 1, 1A:
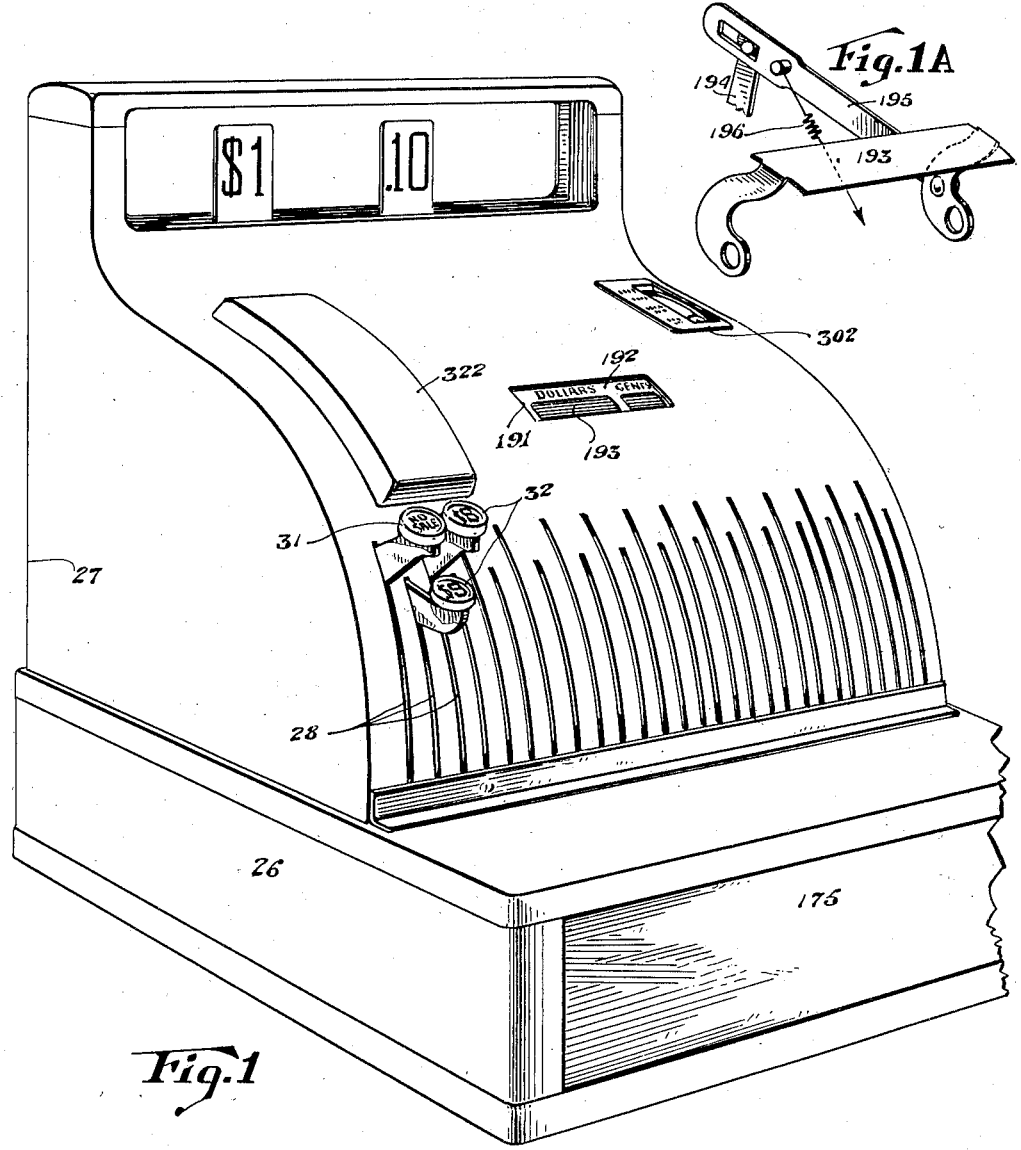
Fig. 1 is a perspective view of the machine to which the present invention is applied showing a few of the operating keys. This view also shows the location of the single lock control lever, and the protective cover over the counters and reset lever.
Fig. 1A is a perspective view of the totalizer shield with its operating link and arm.

Turning first to a description of so much of the machine of my aforesaid application No. 183,392 as may be helpful to an understanding of my present invention, it may be noted that the main supports of the machine are two parallel side plates 20 and 21 (Fig. 2). These plates are connected at the front by a cross member 22 (Fig. 3) and at the rear by cross members 23 and 24 and an intermediate cross member 25. The framework just described rests upon a drawer base 26 and is attached thereto. As best shown in Fig. 1 the mechanism is enclosed by a cabinet 27 which is slotted at 28 to receive and guide the key levers. The cabinet is apertured at its upper end to permit viewing of the raised indicators thru diaphanous material at the front and rear.

The machine is provided with keys 32 divided into groups (Fig. 2) one group for registering amounts from 1¢ to 9¢, another group for 10¢ to 90¢, and a third group for values of $1 to $9. A special "No Sale" key 31 is also provided and used mainly for releasing the cash drawer to make change. As best shown in Fig. 3 the keys 32 and "No Sale" key 31 are pivoted on a shaft 33 supported by the side plates 20 and 21. The keys move in the slots 28 formed in the cabinet and at their rear are guided by slots 35 (Figs. 3 and 7) formed in a plate 36 secured to the cross bar 25.

All the keys are provided with notches 38 (Fig. 3) adapted to receive the rearward end of a key coupler 39 which extends between the side plates and rests upon the rear ends of the keys. The key coupler is pivotally supported from a shaft 42 by means of plates secured to said coupler and apertured to receive said shaft. One of said plates is shown at 41 in Figs. 2 and 8 and a similar plate is provided at the opposite end of the coupler. The purpose of such key coupler mechanism is well known and need not be discussed.

To insure a complete movement of the keys in both directions the plate 41 (Fig. 8) which supports one end of the key coupler is extended upwardly and to the rear to form a segment 43 provided with teeth 44 adapted to coact with a pawl 45 to which a spring is connected. This mechanism blocks any retrograde movement of the keys and key coupler until the downward stroke of the keys is completed.

The differential devices controlled by the various groups of keys for entering the amounts in the totalizer are all similar in construction and operation and a description of one will suffice for all.

The differential device associated with the dollars bank of keys is shown in Fig. 3 wherein it will be noted that mounted upon the shaft 42 is a frame comprising parallel side members 47 (see also Fig. 2) integrally joined by a cross bar or bail 48 which normally stands over the projections 46 of the keys of the dollars bank. The frame just described is attached to the shaft 42 by a pin 49 (Fig. 2). Also attached to the shaft 42 at substantially its mid-portion is a segmental rack 50 adapted to operate the dollars element of the totalizing devices to be described hereinafter in detail.

As will be noted in Fig. 3, the rearward portions of the upstanding projections 46 of the keys of a group are suitably cut away so as to form steps 51 which are at different distances from the cross bar 48. The graduations are directly in the path of the cross bar 48, the consequence being that when the keys are depressed a lost motion is effected between the keys and the frame, but at a certain time the step 51 of the depressed key will coact with the frame to operate it and in this manner a differential movement is given to the frame depending upon the key depressed. All the keys of the dollars bank have the same extent of movement and since in this manner the rack 50 will be operated differentially the associated totalizer element will be operated correspondingly.

The differential frame associated with the cents bank of keys is shown in Fig. 2 and denoted by reference character 52. This frame is loosely mounted upon the shaft 42 and one of the side members of the frame has attached thereto a cents operating rack 53. The nine keys associated with the cents bank are provided with differential graduations similar to those described in connection with the dollars bank of keys.

The frame member 54 for the dimes bank of keys is shown in Fig. 2 and is connected to the dimes rack 55 by a stud 56 (Fig. 14).

As shown in Fig. 3 the parallel side members of the dollars frame are extended forward of the shaft 42 and are joined by a cross rod 57 to prevent overthrow. From Fig. 3 it will be seen that the keys are provided with upstanding portions 58 the upper edges of which are at different heights so as to provide differential steps which are complementary with respect to the steps 51. From this construction it follows that as a key is depressed the projection 51 thereof will cooperate with the cross bar 48 rocking the frame differentially until the rod 57 engages the upstanding portion 58 of the depressed key, whereby said frame is positively stopped in its proper position and excess movement thereof prevented.

To positively restore the differential frames there is loosely mounted on shaft 33 a bell-crank for each frame, one arm 60 of the bell-crank coacting with the coupler and the other arm 61 with the cross rod 57. It is apparent that during the restoration of the coupler the arms 61 of the respective bell-cranks will act upon the associated rods 57 and differential frames to restore the same to normal position.

For preventing depression of more than one key in a bank during an operation of the machine a series of key stops 62 (Fig. 7) are provided; the wedge-shaped lower ends of which stops cooperate with the rear ends of the keys in the usual manner so that upon depression of a key in a bank the end of said key will fill the only available space between the key stops of the corresponding group and the remaining keys of the bank will thereby be locked.

The machine also includes a totalizing device whereby the items determined by the operated keys are registered so as to furnish a total of the amounts entered in the machine. The registering mechanism in the main is carried by a frame comprising side plates 67 and 68 (Figs. 2 and 3) which are tied together at their rear ends by a cross rod 69 and bifurcated at their lower portions to engage the shaft 42. The frame is held in position by a shaft 70 journalled in the side frames 20 and 21 and passing through circular apertures formed in each of the side members 67 and 68.

The totalizing device comprises a frame having side members 71 and 72 (Figs. 2 and 3) integrally connected by a cross member 73. The totalizer frame carries a shaft 74 upon which is loosely mounted a series of registering wheels 75. Pinions 76 are attached to the wheels 75 that correspond with the segments 53, 55, and 50 aforesaid, and are adapted to mesh with said segments. Also, included in the series of wheels 75 are wheels of higher denominational order than those corresponding with said segments, said higher order wheels being adapted to receive the overflow of accumulations from said lower order wheels so that totals of higher orders may be accumulated. The totalizer frame 71—72 is pivoted within the stationary frame 67—68 by short pins 77 (Fig. 3) passing through the side members 67 and 68 and into the respective side members 71 and 72 of the totalizer frame. Said pins are the pivots about which the totalizer frame is adapted to be rocked during the initial depression of the keys so that the totalizer pinions 76 will be immediately rocked into engagement with the actuating racks, the latter being then differentially operated under control of the keys so that at the extreme end of the depression of the keys a corresponding amount will have been entered into the totalizing device. Upon the return movement of the keys the totalizer pinions will be disengaged from the racks thus permitting the latter to return to their normal positions without affecting the entry made upon the totalizer. The mechanism for effecting the above-mentioned rocking of the totalizer frame will now be described.

Loosely mounted upon the shaft 42 and slotted so as to engage the key coupler 39 is a segment plate 78 (Figs. 2 and 3) which extends vertically in a plane adjacent the side frame 67. The segment plate at its upper end is provided with bent over lugs 79 and 80 and carries a supporting collar 81 (Fig. 3). Pivotally mounted by means of a pin fitting in the collar 81 is a plate 82 provided with stop shoulders 83 and 84 which are adapted to cooperate with the lug 79. A switching cam plate 85 is attached to the plate 82 by suitable means such as a pair of rivets. A spring 86 connected between the segment 78 and the plate 82 normally retains the parts in the position shown in the drawings. The shaft 74 mounted in the totalizer frame is adapted to be engaged by an open ended slot formed in a member 88 which is pivoted at 89 to the supporting frame member 67. The rearward end of the member 88 carries a pin 90 normally resting upon the lug 80 and the member 88 is also provided with a pair of stop shoulders 91 and 92 adapted to cooperate with a pin 93 carried by the frame member 67.

In the position shown in the drawings (Fig. 3) it will be noted that the totalizer frame is normally locked and any downward movement, accidental or intentional, will be prevented by the cooperation of the pin 90 with the lug 80, while upward movement is prevented by the shoulder 92 engaging the pin 93. During the operation of the machine the key coupler 39 will rock the plate 78 clockwise and the initial movement will permit the totalizer frame to be rocked by the member 88 so that the totalizer pinions 76 may engage their related rack segments since at this time the pin 90 will pass between an inclined portion of the lug 80 and the adjacent edge of the switching cam plate 85. Continued rocking of the plate 78 will positively cam the totalizer frame by the action of cam plate 85 to carry the totalizer elements into their lower or engaged position this action being assisted by the weight of the totalizer frame.

At the beginning of the return movement of the plate 78, which is contemporaneous with the return stroke of the keys, the rearward edge of the cam 85 raises the pin 90, thereby rocking the totalizer frame to disengage the pinions from the segment racks; and said pinions remain out of engagement with said racks during the entire return stroke of the keys.

For transferring or carrying to the totalizer wheel of next higher order, each wheel below the highest denomination is provided with a pin 115 (Fig. 15) which is in the plane of an extension 116 of a corresponding spring-urged trip pawl 117 provided with a shoulder 118. A series of transfer pawls 120 are provided, each of which is pivotally carried by a related arm 122 and has formed near its rearward end a lug 121 normally resting upon the shoulder 118 of the corresponding trip pawl 117. The arms 122 are journalled on a shaft 123 mounted in the totalizer frame 71—72. When a totalizer wheel of a lower order makes a complete revolution, the pin 115 thereon will urge the adjacent trip pawl 117 forwardly thereby disengaging from shoulder 118 the lug 121 of the associated transfer pawl, and permitting a spring 128 to urge said pawl downwardly into operative engagement with a tooth of a ratchet wheel 125 attached to the pinion 76 of next higher order. Consequently, when said transfer pawl is moved rearwardly said pawl will advance said ratchet wheel to effect the transfer. In so doing the transfer pawl will also be raised due to the camming action of the next ratchet tooth so that the lug 121 will again rest upon the shoulder 118. The transfer pawls 120 are successively actuated to effect the necessary transfers by means comprising a series of links 126 (Fig. 14), each connected to a corresponding arm 122 and slotted so as to engage the oscillating transfer shaft 97. Upon said shaft are secured transfer cams 127 each in the plane of a pin 129 carried by its associated link 126. Said cams are arranged spirally on the shaft 97 so as to actuate the links 126 of the different denominational orders seriatim. During the downward stroke of the keys the transfer shaft will be rocked counter-clockwise (Fig. 14) through a segment 95 (Fig. 2) mounted to turn with the key coupler and meshing with a pinion 96 on said shaft, and by the cooperation of the cams 127 with the pins 129 the several links 126 will be successively elevated until the cams clear the pins, whereupon the links drop to their normal position. During the return stroke of the keys the cams 127 will engage the opposite edges of the pins 129 thereby forcing the links forwardly, so that each of the transfer pawls will be actuated and those that have been tripped will effect transfers. When, after forcing its link 126 forward, a cam clears the pin 129, the coil spring 128 connected between the arm 122 and its associated transfer pawl will return said pawl and arm, together with said link, to normal.

The machine also includes a series of indicator tablets 140 (Figs. 2 and 7) which are shiftable by depression of the keys to indicate publicly the items entered thereby. Such indicating mechanism, however, forms no part of the present invention nor would a description of said mechanism be of particular assistance in understanding said invention. Consequently the indicator mechanism will not be here described.

A drawer releasing mechanism in the illustrative machine is carried by a plate 165 (Figs. 3 and 6) secured in position by shafts 33 and 42, the rear of the plate being provided with an extension 166 held under the cross bar 23. The key coupler is provided with a trip pin 168 which is in the plane of a spring-pressed pawl 169 pivoted to a drawer catch release lever 170 which in turn is pivoted on a stud carried by the plate 165. The drawer catch release lever 170 is also provided with a shoulder 171 engaging the upper portion of a drawer catch 172, the latter being provided with a hook portion 173 engaging a portion of a plate 174 carried by the cash drawer 175. A spring 176 connects the drawer catch release lever with the drawer catch. The cash drawer is normally urged outwardly by a spring 1761 carried by the drawer plate 174.

The result of the above construction is that when the key coupler is elevated the trip pin 168 will pass by the pawl 169 without effecting any movement of the drawer release lever 170 or drawer catch 172. During the return movement of the operating keys, which is concomitant with the downward movement of the key coupler, the trip pin 168 will engage the opposite side of the pawl and since the latter contacts with a stud carried by the drawer catch release lever 170 it will rock the latter clockwise against the tension of the spring 176 thereby disengaging the shoulder 171 from the drawer catch. This will result in releasing the hook 173 from the plate 174 and permitting the spring 1761 to be effective to force the cash drawer outward.

In the back part of the machine there is rotatably mounted a shaft 181 whereby a number of functions of the machine may be controlled. One end of said shaft is mounted in the side frame 21, while a bracket 25' secured to the cross bar 25 also receives said shaft and aids in supporting the same. Loosely pivoted on the shaft 181 is a locking arm 182 (Figs. 3 and 6) which is provided with a locking shoulder 183 adapted to cooperate with the rearward end of the coupler 39 and extends further downwardly so as to contact with the drawer plate 174. Attached to said lever 182 is a spring 184 which tends to rock it counter-clockwise (Fig. 3). Secured to the shaft 181 is a downwardly extending arm 185 which is adapted to contact with a lug 186 integral with the locking arm 182. In the position shown in the drawings, it will be observed that when the cash drawer is released the spring 184 will tend to rock the locking arm 182 forwardly so that its locking shoulder 183 will pass over the key coupler upon its return and lock the same as long as the cash drawer is open. This operation, in the position of the shaft 181 and associated parts shown in Fig. 3, is prevented since it will be observed that forward movement of the locking arm 182 will be prevented by the cooperation of the lug 186 with the arm 185. The machine is now in condition for what is known as "open drawer" operation; i. e., the machine may be operated even though the cash drawer be open.

However, when the shaft 181 is turned counter-clockwise in Fig. 3 to what may be termed its "closed drawer" position it will carry the arm 185 slightly forward thus permitting the spring 184 to move the locking arm 182 so that the shoulder thereof will pass over the key coupler and lock the same against movement as long as the cash drawer is open. Thus the machine cannot be operated until said drawer is closed. When the cash drawer is forced inwardly the drawer plate 174 will contact with the lower end of the arm 182 to unlock the key coupler and tension the spring 184.

At times it is desirable to lock the keys and the cash drawer so as to prevent unauthorized persons from having access to the contents of the cash drawer by operating the keys. The illustrative machine provides for this and, as will be noted in Fig. 3, the arm 185 extends upwardly to form an extension 187. Loosely mounted upon the shaft 181 is a supplemental bell-crank locking lever 188 provided with a locking shoulder 189. A spring 190 (Fig. 3) is connected between the extension 187 and the upper arm of the bell-crank lever 188. It will be obvious that in the "open drawer" and "closed drawer" positions of the shaft 181 the lower portion of the locking arm of the bell-crank lever 188 will not be moved sufficiently to cause its shoulder to pass over the flange of the key coupler. When said shaft is moved still further counter-clockwise (Fig. 3) to what may be designated the "lock register" position, it will, through the connected spring 190, move the locking bell-crank lever 188 to bring its locking shoulder 189 over the key coupler 39 thereby securely locking the keys and preventing release of the cash drawer by operating the keys if the drawer should at this time be in its normal position.

It will be noted that when the shaft 181 is in the "lock register" position, and when the cash drawer is in its outward position, the shoulder 183 of the locking lever 182 will also pass over the flange of the key coupler, but this locking action will be disabled when the cash drawer is returned. However, return movement of the cash drawer will not affect the position of the locking bell-crank 188 so that the key-coupler will still be locked by this member.

The shaft 181 is also movable counter-clockwise (Fig. 3) beyond its "lock register" position aforesaid to what may be termed the "reset" position. When said shaft is in the last-mentioned position the lever 188 continues to lock the coupler, said lever being simply rocked further counter-clockwise upon movement of the shaft 181 from "lock register" to "reset" position. Shifting of said shaft to "reset" position also brings a surface 203 (Fig. 3) of lever 185 into engagement with a pin 204 on the drawer catch release lever and actuates the latter to release the cash drawer. This constitutes a manual means for releasing the cash drawer independently of an operation of the machine and it may be used for this purpose at a time when the machine may for some reason become disabled or locked up after the coupler has been partially operated. The yielding connection between the arm 187 of lever 185 and the lever 188 permits the shifting of shaft 181 to "reset" position even though the key coupler is away from normal; the coupler, at such times, holding back the lever 188 against the tension of the spring 190.

In all but the "reset" position of the shaft 181, the totalizer wheels are covered by a shutter 193 (Figs. 1, 1A and 3) pivoted to the side plates 71 and 72 of the totalizer frame. An arm 194 is attached to said shaft 181 and is provided with a pin engaging a closed slot in a link 195 connected to one arm of said shutter. The slot in link 195 is of sufficient length that movement of the shaft 181 to any of the first three positions above mentioned will not operate said link, but when the shaft is moved to "reset" position the link will be drawn rearwardly against the tension of a spring 196, thereby rocking the shutter 193 to permit reading of the totalizer elements. The latter may be viewed through an aperture 191 (Figs. 1 and 3) in the cabinet and also through apertures formed in a denomination designating plate 192 secured to the cabinet and lying beneath said aperture 191.

The above described mechanism is shown in my application No. 183,392, hereinbefore identified, and the foregoing description will, it is believed, aid in more readily understanding the invention forming the subject matter of the present application. The inventive features to which this application is particularly directed will now be specifically described.

*Lock control lever*

I have devised improved manipulative control means selectively operable by authorized parties to different controlling positions and which will be found to be both simple in construction and highly effective in operation. This control means may be connected to the previously described shaft 181 and may be constructed as follows:

A control lever 300 having a hub 305 is pivotally mounted on the side frame 21 through the medium of a screw 306. Said control lever has mounted thereon by rivets 304 a lock 301 which projects through an opening in a plate 302 (Fig. 5) fastened to the machine cabinet and carrying legends designating different positions of adjustment of said lever. A shield plate 303 is also secured to the lever by said rivets 304. Pivotally mounted on said lever at 308 is a latch arm 307 having at one end a pin 309, which pin is receivable in any one of four indexing notches 310 in a plate 311 secured to the side frame 21. Said notches correspond with the control positions of said lever as indicated on said legend plate. The arm 307 is continuously urged into engagement with the notches 310 by a spring 312 which is connected at one end to said arm and at the other to the lever 300. Pinned to the barrel of the lock 301 is a member 315 having a finger 316 (Fig. 2) extending into a position for cooperating with the rear portion of the latch arm 307. In the normal position of the parts, said finger 316 overlies said rear end of the arm 307, thereby preventing disengagement of the pin 309 from the notch 310 in which it is received, and thus the control lever 300 is locked against movement. However, by turning the lock so as to remove said finger 316 from the path of the arm 307, the latter is free to move about its pivot 308 and the control lever 300 may then be adjusted to any desired position; the pin 309, during such adjustment of said lever, riding over the projections intermediate the notches 310 until it engages the notch appropriate to the new position to which the lever is moved. By then turning the lock so that the finger 316 overlies the arm 307 the control lever 300 is locked in its new position of adjustment. The rear end of the arm 307 may be beveled as indicated at 307' in Fig. 4, whereby centering of the parts with the pin 309 in the deep portion of the notch 310 is positively insured when the finger 316 is turned into engagement with said arm.

For transmitting movement of the control lever 300 to the shaft 181 hereinbefore described, an arm 318 is secured to said shaft and has a notched forward end which engages a pin 320 on said lever. It will be noted that the positions designated by the legend plate 302 (Fig. 5) are "Open drawer", "Closed drawer", "Lock register", and "Reset". The positions of the shaft 181 corresponding therewith have been previously referred to herein.

Preferably the lock 301 is operable only by a key in the possession of the proprietor or other authorized party. As shown in Fig. 5, the key may also serve as a reference member for cooperation with the designations on the legend plate 302. When said key is turned to release the arm 307, the head of said key extends parallel to the legends aforesaid (as indicated in Fig. 5) and by then moving the lever 300 until said key head is aligned with the desired legend said lever is brought to the position which said legend indicates.

*Control of resetting*

My invention further includes the provision of novel and effective mechanism for controlling resetting of the totalizer, which mechanism will now be described.

To effect resetting I provide a manipulative lever 321 (Figs. 8 and 9) located in the left hand section of the machine and normally concealed by a cover 322. The latter is normally locked by means of a latch 323 provided with a shoulder 324 which engages a plate 325 secured to said cover. Said latch is pivoted on a stub shaft 326 which, as shown in Fig. 2, extends between stationary frame plates 327 and 328 mounted at their forward ends on the shaft 70. The plate 327 extends rearwardly and is provided with a downwardly projecting portion 329 that is bifurcated at its lower end and rests upon the shaft 181 as shown in Fig. 9. Said projecting portion 329 may, if desired, be fastened to a bracket 329' secured to the cross bar 25 at the back of the machine.

Upon moving the control lever 300 to the "reset" position indicated by the legend plate 302, the shaft 181 is positioned to unlatch the cover 322 so as to afford access to the resetting lever 321. For this purpose there is pinned to said shaft 181 an arm 330 (Figs. 9 and 13). In Fig. 9, this arm is shown in the position corresponding to the "open drawer" setting of the control lever 300 and shaft 181, while in Fig. 8, the parts are in the "lock register" position. Adjacent said arm 330 there is loosely mounted on the shaft 181 a lever 331 (Figs. 9 and 13) normally urged into contact with a stud 332 on arm 330 by a spring 333 which extends between said stud 332 and a stud 334 on an extension of lever 331. Attached at one end to lever 331 by a stud 335 is a link 336 which at its other end is connected by a stud 337 to the latch 323. From Fig. 9 it is apparent that there can be considerable movement of link 336 to the left before the latch shoulder 324 is disengaged from the plate 325. However, if the control lever 300 is shifted to the "lock register" position, turning shaft 181 and arm 330 counter-clockwise (Fig. 9), spring 333 will urge lever 331 and link 336 to the left until the parts are in the position shown in Fig. 8, with only a portion of shoulder 324 engaging the plate 325. Movement of the control lever 300 one more step to "reset" position will disengage the latch from the plate 325 and the cover may then be raised, giving access to the reset lever 321. When the cover 322 is again lowered and the control lever subsequently moved to a position other than "reset", the latch 323 will be shifted so that its shoulder 324 again engages the plate 325, holding the cover latched down until the lock-controlled lever 300 is again moved to "reset" position.

It has previously been noted herein that even though the coupler be away from its normal position, the shaft 181 may be shifted to "reset" position to release the cash drawer. It is desirable that shifting of the control lever and shaft 181 to "reset" position when the coupler is in partially elevated position shall not render accessible the lever 321. To maintain said lever inaccessible under such conditions I provide the lever 331 with a downward extension 340. The latter just clears the end of the coupler when the control mechanism is in the "lock register" position shown in Fig. 8 but when said mechanism is in the "reset" position the lower end 341 of said extension 340 will, if the coupler is in its lowermost or normal position, pass over said coupler, thus constituting an additional lock therefor. Should the coupler be raised from its normal position at the time the control mechanism is moved to "reset" position, the edge 342 of the extension 340 will contact with the edge of said coupler so that the lever 331 cannot be rocked to disengage the latch 323 from the plate 325. Unlatching of the cover 322 is thus prevented, but notwithstanding the blocking of movement of the extension 340 and lever 331 by the key coupler the control lever 300 and shaft 181 may be moved to "reset" position to release the cash drawer; the spring 333 between lever 331 and arm 330 yielding to permit such adjustment of said control lever and shaft.

It may be noted that by extending forwardly the lower edge 341 of the extension 340, said edge may be brought over the coupler in the "lock register" position of the control mechanism and that thereby the locking lever 188 may, if desired, be omitted.

The resetting lever 321 is pivotally mounted on the shaft 42 and has attached thereto by rivets 344 a gear segment 345 which meshes with a pinion 346 (Fig. 9). Secured to the latter, as by a screw 347, (Fig. 2) is a trunnion member 350 journaled for rotation in a hub 348 on the frame 327. A finger 351 extends from said member 350 and engages a slot 352 in an extension of the totalizer shaft 74. The coupling thus formed by the slot 352 and finger 351 permits the totalizer to be rocked into and out of mesh with the actuating racks hereinbefore described.

The shaft 74, as in my prior application aforesaid, is provided with a shouldered groove 205 (Figs. 14 and 15) adapted to cooperate with pawls 206 on the respective totalizer wheels so that by turning said shaft said groove will pick up said pawls and restore the wheels to normal or zero position. The totalizer wheels are reset to zero by rotation in the same direction as in adding operations. When the resetting lever 321 is drawn forwardly the pinion 346 is turned counter-clockwise (Fig. 9) and the shaft 74 thereby turned in the proper direction for restoring said totalizer wheels to zero.

*Restoration of tripped transfer pawls during resetting operations*

Since the totalizer wheels are restored to zero by rotation in the same direction as that in which they are driven by the actuating segments, it will be evident that during resetting operations the trip pawls 117 will be actuated and the transfer pawls 120 thereby set into position for effecting carrying. It is thus necessary to restore said transfer pawls to their normal inactive positions, since irregular transfers would otherwise be effected during the first subsequent operation of the machine. Referring to Fig. 16, it will be seen that the shaft 74 has attached thereto a cam 354 which is in the plane of one arm of a bell-crank 355 (Figs. 2 and 16) pivoted on the frame member 68. The other arm of the bell-crank 355 carries a pin 217 engaging a bifurcation in an arm 218 attached to a shaft 219, which shaft is mounted in the totalizer frame 71—72. A coil spring 220 acting between a fixed stud and the pin 217 urges the arm 355 against the periphery of the cam 354. The shaft 219 is provided with a plurality of slots 221 (Figs. 2 and 15) adapted to receive and guide the transfer pawls 120 as well as restore them after they have been tripped during a resetting operation.

The operation of the foregoing mechanism may now be briefly pointed out. When the resetting lever 321 is drawn forwardly, the shaft 74 turns counter-clockwise (Fig. 9) and the groove 205 picks up the variously positioned pawls 206 to restore the totalizer elements. During said counter-clockwise rotation of said shaft, the periphery of cam 354 will cooperate with extension 356 of bell-crank 355 and gradually rock the latter so that through the pin 217 and arm 218, the slotted shaft 219 is rocked clockwise (Figs. 15 and 16). This rotation of shaft 219 brings the solid portion of said shaft into contact with the transfer pawls 120 and rocks said pawls slightly upwardly, the lugs 121 at this time sliding along the upper rearward edges of the associated trip pawls 117. When the highest part of the cam 354 contacts the arm 355, the transfer pawls are in their highest positions and during the continued counter-clockwise rotation of shaft 74 the bell-crank 355 and shaft 219 will rock counter-clockwise, thus permitting the transfer pawls 120 to be lowered. At substantially the end of the counter-clockwise rotation of the shaft 74 all of the totalizer elements will be passing from their "9" to their "0" positions, at which time the trip pins 115 will cooperate with the trip pawls 117, releasing all the transfer pawls 120 in the same manner that they are released during a regular transfer operation.

When the shaft 74 has brought all the totalizer wheels to zero, further counter-clockwise rotation of said shaft is stopped by the abutting of an extension 357 of cam 354 against one side of the finger 356 on crank 355. The resetting lever 321 is now returned to its normal position, during which time the pinion 346 and shaft 74 rotate clockwise. This operation will have no effect on the totalizer wheels, which have been brought to their zero positions as aforesaid, but will restore to normal the tripped transfer pawls 120. Thus, as the shaft 74 commences rotating clockwise, the cam 354 rocks the crank 355 and shaft 219 clockwise, and the bottoms of the slots 221 in said shaft 219 cam upwardly the tripped transfer pawls and bring the shoulders 121 thereof above the shoulders 118. At this time, the trip pawls 117 are moved by their springs to their normal positions (Fig. 15). When the high part of cam 354 comes under the extension 356 on crank 355, the pawls 120 are in their highest positions and continued clockwise turning of the shaft 74 permits the shaft 219 to be restored to normal, thereby lowering the pawls 120 slightly until their lugs 121 again engage the shoulders 118 of pawls 117. The return stroke of the resetting lever is positively stopped by the striking of extension 357 against the rear side of finger 356 as shown in Fig. 16, at which time the resetting lever is in its normal position and the transfer mechanism is again in the condition shown in Fig. 15, permitting transferring to be performed in the regular manner.

In my previously mentioned application, Serial No. 183,392, there is disclosed the above-mentioned slotted shaft 219 as well as means for operating the same during resetting operations to restore the tripped transfer pawls 120. However, there is not shown in said application a cam (such as cam 354 aforesaid) which both causes operation of said shaft 219 to restore said pawls and also acts as a stop for movements of the resetting mechanism. My cam 354 serves the plural function of limiting movement of the resetting mechanism in both directions and of causing restoration to normal position of the tripped transfer pawls.

A spring 359 holds the resetting lever in normal position and is adapted to return it to that position when the lever is moved.

Interlocks

To insure the proper operation of the machine and to prevent fraudulent misoperation, my invention also comprises certain protective interlocking mechanisms. These devices prevent the operation of the reset lever if the lock controlled lever is not in "total and reset" position, even if the cover should be unlatched. They prevent operation of the machine while the reset lever is being operated and vice versa. They also prevent movement of the lock controlled lever out of "total and reset" position if the reset lever is in operation. On the frame 327 is a stud 360 (Figs. 2 and 9) upon which is pivoted a locking arm 361 (Fig. 9) provided with a cam face 362. A stud 363 on the reset lever 321 cooperates with the cam face 362 to raise the arm 361 as the reset lever is moved forward. To keep the cam face 362 in constant cooperation with stud 363 the upper end of spring 359 is attached to an ear 364 on arm 361. An overturned lug 365 on the previously mentioned link 336 normally overlies a projection 366 on arm 361. Movement of the reset lever 321 tends to rock arm 361 counter-clockwise (Fig. 9) about pivot 360, lifting projection 366; but lug 365 prevents the lifting of projection 366, and consequently operation of the resetting lever, in all but the "reset" position of the control lever 300. If said control lever is moved to the "reset" position, then, through shaft 181, arm 330, and lever 331, lug 365 is shifted sufficiently to the left (Fig. 9) to allow projection 366 to be moved upwardly, and the resetting lever is freed for operation. It can be seen that once the reset lever is in operation, the control lever 300 will be locked in "reset" position and an endeavor to move it out of that position will be obstructed by the right side (Fig. 9) of lug 365 contacting with the left side of projection 366. Since the machine is locked against operation when said lever 300 is in "reset" position, as has been pointed out, it will be evident that locking of the machine is insured during operation of the resetting lever. On the other hand, if the key coupler 39 is raised from normal position, movement of the link 336 sufficient to withdraw lug 365 from the path of projection 366 (or in other words to unlock the resetting lever) is prevented by the contacting with said coupler of extension 340 of the lever 331; and thus the resetting lever is positively blocked against actuation during operation of the machine or whenever said coupler is out of normal position.

Counters

The present invention also includes the provision of three consecutive number counters; one for counting the operations of the machine, another for counting the operations of the no-sale key, and a third for counting the effective operations of the resetting lever. These counters are designated generally by the numerals 367, 368, 369, respectively, and are located under the cover 322, whereby they are rendered accessible only on the lifting of that cover after its release by the control lever 300.

The counters 367 and 368 are mounted on a common shaft 370 supported by the frames 327 and 328 previously described. Said counters may be viewed through an aperture 371 (Fig. 8) in the cabinet 27. The reset counter 369 is mounted in the upper portion of the machine, on a shaft 390, supported between frames 327 and 391, and may be viewed through an opening 373. All said counters may be of the well-known deep-notch transfer type and a general section through one of them (i. e., the no-sale counter 368) is shown in Figs. 10 and 12. A brief description of the counter construction shown in these figures will suffice for all.

As shown in Fig. 10, the numeral wheel 368' has secured thereto a ratchet wheel 374 with nine ordinary depth teeth and one deep notch 375. Reaching across the entire counter 368 and pivoted on the counter shaft 370 is an operating bail 376 carrying a shaft 377 upon which is pivoted a stepped pawl 378 cooperating with all the wheels of the counter 368, in a manner well known in the art. A spring 379 between the bail 376 and the stepped pawl 378 urges said pawl into contact with ratchet wheels 374. For holding the wheels 368' in the positions to which they are turned, there are provided a series of retaining pawls 380 which are held in engagement with the ratchet wheels 374 by springs 381 in the counter frame. Said retaining pawls and springs are carried by a stationary bar 382 extending between the frame members 327 and 328.

For operating the no-sale counter bail 376 there is provided a lever 383 which engages a pin 384 on said bail. Said lever has a downwardly extending slotted arm 385 engaging a pin 386 on the no-sale key 31. It will be seen that when the no-sale key is depressed, the lever 383—385 will be rocked counter-clockwise (Fig. 9) and the bail 376 thereby actuated to add a unit to the no-sale counter 368. During the ensuing return of the no-sale key to normal, the bail 376 and lever 383—385 are restored to their normal positions, the pawl 378 moving idly over the ratchet wheels 374 and the counter being retained by the pawls 380 in its new position of adjustment.

The counter 367 is operated from the key coupler 39, for which purpose a plate 387 is pivotally mounted on shaft 42 and is slotted for engagement with said coupler. A link 388 is connected at its rear end to said plate 387 and at its forward end, through a pin or rivet 388', to a bail 389 which cooperates with the counter 367 in the same way that bail 376 cooperates with the counter 368. When the key coupler is rocked about the shaft 42 the bail 389 is rocked through plate 387 and link 388, adding a unit in said counter 367.

The reset counter 369, as has been mentioned, is mounted in the upper portion of the cabinet under cover 322 and its shaft 390 (Fig. 9) is supported between the frame 327 and a small frame 391. Said frame 391 is fastened to frame 327 and spaced from it by a stud 392 (Fig. 2) and by the holder 392' for the retaining pawls 393. The operating bail 394 (Fig. 9) for this counter has a stepped pawl similar to pawl 378 (Fig. 10) and has also on one of its side arms a pin 395 which is adapted to be engaged by a finger 396 on the arm 361 previously mentioned. It can thus be seen that an operation of the reset lever will, by lifting arm 361, rock the bail 394 through the action of finger 396 on pin 395 to thereby add a unit to said reset counter. Upon the return movement of the reset lever and the lowering of finger 396 however, the bail 394 will not follow, but will be held frictionally in its operated position. Consequently, subsequent idle operations of the reset lever will not affect the counter. It is only by an operation of the machine that the counter operating mechanism will be restored to effective condition. The means for conditioning the counter for a new operation comprises a pin 397 (Figs. 2 and 8) mounted in the right side arm (Fig. 2) of the bail 394. This pin 397 extends through a slot 327' in the counter side frame 327 and is in the path of the head 398 (Fig. 8) of a lever 399 which is adapted to be oscillated on each operation of the machine. The lever 399 is loosely mounted on shaft 181 and has a cam face 400 in the path of the key coupler 39. The face 400 is not concentric with the arc of the key coupler, but overlaps the path of the end of the coupler so that operation of the machine will rock the lever 399 counter-clockwise (Fig. 8) and the head 398 of the lever will engage the pin 397 and rock the bail 394 clockwise to normal position. From the foregoing description it will be apparent that, once the reset lever is actuated and the totalizer wheels thereby restored to zero, a subsequent operation of said lever occurring without an intervening operation of the machine will not be counted, wherefore, only effective operations of the reset lever will be registered on the counter.

When the cover 322 is unlatched, access is given to a knurled wheel 401 (Fig. 9) for resetting the counters 367 and 368. Said wheel 401 is secured to the left end of shaft 370 (Fig. 2) and a portion of it projects through a slot in the cabinet 27 (Fig. 8). Each numeral wheel of the two counters 367, 368, has a recess 402 (Fig. 12) in which is pivoted a resetting pawl 403. The pawls 403 are held in contact with the shaft 370 by compression springs 404. A notch 405 (Fig. 10) in shaft 370 is cut the full length of the shaft and is adapted to engage all the pawls 403. It is evident that by rotating the knurled wheel 401 and attached shaft 370 counter-clockwise (Fig. 12), the notch 405 may be caused to pick up the pawls 403 in whatever positions they may be and the counter wheels thereby restored to their zero position.

*Summary of operation*

To summarize briefly the operation of the previously described embodiment of my invention, the operator of the machine may, by adjustment of the lever 300, control the setting of the machine in accordance with the indications on the legend plate 302. To shift said lever 300, the key is first turned to operate the bolt of lock 301, thereby releasing the detent 307 for movement and freeing the lever for adjustment. The head of the key now extends transversely of the slot 303 and upon moving the lever until said key head is in line with the desired designation on the plate 302 the machine is placed in the condition which said designation indicates. The key may now be turned to lock the detent 307 and lever 300 against movement and may then be withdrawn, so that none but authorized parties may shift said lever.

Movement of the control lever 300 to the "reset" position unlocks the lid 322, whereby the latter may be raised. Raising of said lid exposes to view the operation counter 367, the no-sale counter 368, and the reset counter 369, so that the readings of said counters may be noted. Also, raising of lid 322 affords access to the knurled wheel 401 for resetting the operation and no-sale counters, and to a lever 321 for resetting the totalizer wheels. Upon turning said lever 321 clockwise (Fig. 9), the pinion 346 and totalizer shaft 74 are rotated counter-clockwise until stopped by the abutting of extension 357 on cam 354 against the forward side of finger 356 on crank arm 355. The totalizer wheels have now been brought back to zero and the lever 321 may then be returned to normal which return may be effected solely or by the aid of the spring 359; the return movement of said lever, together with the pinion 346 and shaft 74, being stopped by said extension 357 in cooperation with the rear side of finger 356. Since in resetting operations the totalizer wheels are turned in the same direction as in adding operations, the resetting of said wheels to zero trips the transfer pawls 120, and during the return of the resetting lever to normal the cam 354 and associated parts restore said tripped pawls to their normal positions.

When the resetting lever 321 is turned clockwise (Fig. 9), the arm 361 is raised so that the finger 396 thereon actuates the operating bail 394 for the reset counter 369 and adds a unit to said counter. During the return of lever 321 to normal the arm 361 moves downwardly under the action of spring 359, but the bail 394 remains frictionally in its raised or operated position. Should the reset lever now be again moved clockwise, such operation would be idle since the totalizer wheels were restored to zero on the preceding operation, and such idle operation will not be entered on the counter 369; the operating bail 394 being in its operated position and the arm 361 simply moving upwardly without actuating said bail. Before the counter 369 can again be actuated, the machine must be operated, whereupon the coupler 39 will act upon the cam arm 400—398 so that the latter will, in cooperation with pin 397 on bail 394, restore said bail to its normal or lower position.

When the control lever 300 is in any position other than "reset" the resetting lever 321 is locked against actuation by the link 336, an overturned finger 365 of which overlies projection 366 of arm 361. Upon turning lever 300 to "reset" position the forward end of lug 365 lies just to the rear of said projection so that the resetting lever may be actuated; and during the operation of said resetting lever the projection 366 extends in front of the lug 365 so that the control lever cannot be moved out of "reset" position. Since the key coupler is locked in its lowermost or normal position when the control lever 300 is in "reset" position, it will be apparent that the machine cannot be operated when the resetting lever is conditioned for actuation and since actuation of said resetting lever blocks movement of the control lever out of "reset" position, it is evident that locking of the machine against operation is insured during actuation of said resetting lever. Also, inasmuch as the link 336 is in position for locking the resetting lever when the machine is unlocked by the control lever 300, the resetting lever cannot be operated when the machine is unlocked for operation even if the lid 322 were at that time open.

Movement of the control lever 300 to "reset" position to release the cash drawer is permitted even though the key coupler 39 be raised from normal position, as when the machine is partially operated, but such setting of said control lever with the key coupler away from normal will neither unlock the cover 322 nor release the resetting lever 321. Under such conditions the extension 342 of lever 331 will strike the raised coupler 39 so that movement of lever 331 and link 336 to unlocking position will be prevented. At the same time, notwithstanding such blocking of said lever 331, the spring 333 connected between lever 331 and arm 330 permits movement of the control lever to "reset" position.

The form of mechanism herein described is well adapted to fulfill the objects stated, but, it is to be understood that it is not intended to confine the invention to the one form of embodiment herein shown, since it may be embodied in various forms, all coming within the scope of the claims which follow:

What is claimed is:

1. In a machine of the class described, the combination of a main operating mechanism, a consecutive-number counter, means for actuating the said counter, devices operated by the main operating mechanism for conditioning the said counter for a new actuation, and interlocks between said means and said devices which prevent operation of either one while the other is in operation.

2. In a machine of the class described, the combination of a resetting lever, a counter for indicating the number of effective operations of the lever, a main operating mechanism, and connections therefrom for conditioning the counter for a new operation, said connections requiring an operation of the counter by the said lever before they are effective.

3. In a machine of the class described, the combination of a totalizer, resetting devices for the totalizer, a consecutive-number counter, a main operating mechanism, interlocks preventing simultaneous operation of the said resetting devices and the main operating mechanism, means controlled by the said resetting devices for actuating the counter, and means necessitating an intervening operation of said main operating mechanism before said counter can again be actuated under control of said resetting devices.

4. In a machine of the class described, the combination of a control lever adapted to be locked in any one of a plurality of positions, a totalizer, normally latched resetting devices for the totalizer, a normally latched cover for the resetting devices, means for unlatching the said cover and said resetting devices when the said control lever is moved to a certain position, a counter, and means under control of the resetting devices for operating the counter and holding the control lever locked in the said certain position during resetting.

5. In a machine of the class described, the combination of a normally locked reset lever, a main operating mechanism, a control lever adapted to be locked in any one of a plurality of positions, means under control of the said control lever whereby movement of the latter to a certain position effects unlocking of the said reset lever and locking of the main operating mechanism, and means comprising a yielding connection between said control lever and said means whereby when the operating mechanism is partially operated the control lever may be moved to said certain position and the reset lever retained in locked condition.

6. In a machine of the class described, a totalizer, resetting means therefor, a counter for counting effective operations of said resetting means, a main operating mechanism, means partially operated by said resetting means for actuating said counter, and means requiring an operation of said main operating mechanism to complete the actuation of said partially operated means.

7. In a machine of the class described, the combination of a control lever adapted to be locked in any one of a plurality of positions, a totalizer, normally latched resetting devices for the totalizer, a normally latched cover for the resetting devices, means set by the said control lever upon movement thereof to a certain position whereby the said cover and said resetting devices are unlatched, mechanism obstructing the setting of the said means by said lever if the machine is partially operated, and a yielding connection between said lever and said means permitting movement of said lever to said position notwithstanding said obstructing of said means.

8. In a machine of the class described, the combination of a series of totalizer elements, transfer mechanism which is tripped during zeroizing operations, an oscillatory resetting shaft for zeroizing the totalizer elements and means for restoring the tripped transfer mechanism to normal position, which means also acts as a positive stop for limiting the oscillatory movement of said resetting shaft in each direction of oscillation.

9. In a machine of the class described, the combination of a series of totalizer elements, transfer mechanism which is tripped during zeroizing operations, an oscillatory resetting shaft for zeroizing the totalizer elements, and means operated by movement of said shaft for restoring the tripped transfer mechanism to normal position, said means also acting as a positive stop for limiting the oscillatory movement of said shaft in each direction of oscillation.

10. A cash register having a plurality of distinct conditions of operation, a control lever shiftable to distinct positions for producing such conditions of operation, a latch arm carried thereby and movable with respect thereto, a member having a series of notches corresponding to said positions of said lever engageable by said arm, and means movable into and out of position for preventing disengagement of said arm from said notches, said means being mounted on said lever.

11. A cash register having a plurality of distinct conditions of operation, a control lever shiftable to distinct positions for producing such conditions of operation, a latch arm mounted thereon and movable with respect thereto, a member having a series of notches corresponding to said positions of said lever engageable by said arm, means biasing said arm into engagement with said notches, and lock controlled means carried by said lever and operable to prevent movement of said arm out of engagement with said notches.

12. A cash register having a plurality of distinct conditions of operation, a control lever shiftable to distinct positions for producing such conditions of operation, a detent arm mounted thereon for movement with respect thereto, and means carried by said lever for locking said detent arm.

13. In a machine of the class described, a control element having a plurality of positions, a plurality of indications corresponding with said positions, means adapted to lock said element in any of said positions, and a key for controlling said locking means and cooperating with said indications to determine the position of said element.

14. In a machine of the class described, a control element having a plurality of positions, a plurality of indications corresponding with said positions, means adapted to lock said element in any of said positions, and a key for controlling said locking means, the head of said key extending parallel with said indications when said key is set in a position wherein said element is unlocked.

15. In a machine of the class described, a control element having a plurality of positions, a plurality of indications corresponding with said positions, locking means for said element, and a reference member for determining the position of said control element with respect to said indications, said reference member also controlling said locking means.

16. In a machine of the class described, resetting means, a control element, locking means between said control element and said resetting means including a member shiftable upon operation of said resetting means, a counter for registering operations of said resetting means, actuating means for the counter, means whereby said shiftable member effects a movement of said counter actuating means, and additional means to restore the counter actuating means to its normal position.

17. In a machine of the class described, resetting means, a control element, means including a member shiftable by said resetting means for preventing movement of said control element during operation of said resetting means, a consecutive number counter, actuating means therefor, means causing actuation of said member to effect a movement of the actuating means, and additional means to restore the actuating means to normal position.

18. In a machine of the class described, a totalizer, operating means therefor, means for resetting said totalizer to zero, locking means cooperating with said resetting means, a consecutive number counter, mechanism controlled by said locking means for actuating said counter, and means controlled by said operating means for restoring said mechanism to normal position.

19. In a machine of the class described, operating mechanism, resetting means, locking means preventing simultaneous operation of the operating mechanism and resetting means, a consecutive number counter, and means controlled by said locking means and said operating mechanism whereby said counter is caused to register effective operations of said resetting means.

20. In a machine of the class described, a totalizer, operating means therefor, means for resetting said totalizer to zero, means for locking said operating means, means whereby said locking means is prevented from movement out of locking position during operation of said resetting means, and means controlled by said preventing means for counting operations of said resetting means.

21. In a machine of the class described, the combination of a normally locked reset lever; a main operating mechanism; a cash drawer; a control lever adapted to be locked in any one of a plurality of positions; means under control of said control lever whereby movement of the latter to a certain position effects release of the cash drawer, unlocking of the said reset lever, and locking of the main operating mechanism; and means comprising a yielding connection whereby when the operating mechanism is partially operated the control lever may be moved to said certain position to release the cash drawer but the reset lever is retained in locked condition.

22. In a machine of the class described, the combination of a normally locked reset lever; a main operating mechanism; a cash drawer; a control lever adapted to be locked in any one of a plurality of positions; means under control of said control lever whereby movement of the latter to a certain position effects unlocking of the reset lever and release of the cash drawer, and means comprising a yielding connection whereby when the operating mechanism is partially operated the control lever may be moved to said certain position to release the cash drawer but the reset lever is retained in locked condition.

23. In a machine of the class described, the combination of a main operating mechanism, a consecutive number counter, means for actuating the said counter upon initial movement of the means, means enabling a part of the actuating means to return home while another part remains in actuated position, and devices operated by the main operating mechanism for returning home the said part remaining in actuated position, to condition the counter for a new actuation.

CHARLES W. GREEN.